US010178379B2

(12) United States Patent
Wang et al.

(10) Patent No.: US 10,178,379 B2
(45) Date of Patent: Jan. 8, 2019

(54) METHOD AND APPARATUS FOR TESTING VIRTUAL REALITY HEAD DISPLAY DEVICE

(71) Applicant: Beijing Xiaomi Mobile Software Co., Ltd., Haidian District, Beijing (CN)

(72) Inventors: Boxuan Wang, Beijing (CN); Lu Han, Beijing (CN); Lin Meng, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 15/689,675

(22) Filed: Aug. 29, 2017

(65) Prior Publication Data

US 2018/0063517 A1 Mar. 1, 2018

(30) Foreign Application Priority Data

Aug. 31, 2016 (CN) .......................... 2016 1 0798359

(51) Int. Cl.
*H04N 13/00* (2018.01)
*H04N 17/00* (2006.01)
(Continued)

(52) U.S. Cl.
CPC ......... *H04N 13/344* (2018.05); *H04N 13/144* (2018.05); *H04N 13/324* (2018.05);
(Continued)

(58) Field of Classification Search
CPC ............................ H04N 13/344; H04N 17/00
(Continued)

(56) References Cited

U.S. PATENT DOCUMENTS 8,049,775 B2 11/2011 Maeda
2004/0239685 A1 12/2004 Kiyokawa et al.
(Continued)

FOREIGN PATENT DOCUMENTS

CN 101295206 A 10/2008
CN 103597823 A 2/2014
(Continued)

OTHER PUBLICATIONS

Russian Office Action dated from corresponding RU Patent Application No. 2017126372, dated Jul. 11, 2018, 11 pages.
(Continued)

*Primary Examiner* — Jeffery A Williams
(74) *Attorney, Agent, or Firm* — Arch & Lake LLP

(57) ABSTRACT

A method and an apparatus are provided for testing a virtual reality head display device. The method includes: analyzing an acquired pair of images which corresponds to a test image to acquire sets of feature point positions; a left-eye feature point and a right-eye feature point for each set having the same preset color value which is a unique color value in the test image; determining a difference between a first relative position of the left-eye feature point in the left-eye image and a second relative position of the right-eye feature point in the right-eye image according to each set of feature point positions; and determining a result regarding whether the virtual reality head display device is capable to generate a stereoscopic image observable by human eyes according to the difference.

19 Claims, 10 Drawing Sheets

(51) Int. Cl.
*H04N 13/344* (2018.01)
*H04N 13/324* (2018.01)
*H04N 13/398* (2018.01)
*H04N 13/144* (2018.01)

(52) U.S. Cl.
CPC ........... *H04N 13/398* (2018.05); *H04N 17/00* (2013.01); *H04N 2013/0081* (2013.01)

(58) Field of Classification Search
USPC ........................................................ 348/53
See application file for complete search history.

(56) References Cited

U.S. PATENT DOCUMENTS

| | | |
|---|---|---|
| 2008/0266386 A1 | 10/2008 | Maeda |
| 2013/0076875 A1* | 3/2013 | Song ................... H04N 13/128 348/51 |
| 2014/0152768 A1 | 6/2014 | Noh et al. |
| 2014/0218487 A1 | 8/2014 | Lambert |
| 2015/0116316 A1 | 4/2015 | Fitzgerald et al. |
| 2016/0249037 A1 | 8/2016 | Hu et al. |
| 2017/0127040 A1 | 5/2017 | Khabiri et al. |

FOREIGN PATENT DOCUMENTS

| | | |
|---|---|---|
| CN | 104272732 A | 1/2015 |
| CN | 105787980 A | 7/2016 |
| CN | 105867606 A | 8/2016 |
| JP | 07167633 A | 7/1995 |
| JP | 08211332 A | 8/1996 |
| JP | 09009300 A | 1/1997 |
| JP | 09074573 A | 3/1997 |
| JP | 2003199126 A | 7/2003 |
| JP | 2012249192 A | 12/2012 |
| RU | 2322771 C2 | 4/2008 |
| WO | 2012172719 A1 | 12/2012 |
| WO | 2014156033 A1 | 10/2014 |
| WO | 2015066037 A1 | 5/2015 |
| WO | 2018040328 A1 | 3/2018 |

OTHER PUBLICATIONS

First Office Action (including English translation) issued in corresponding Chinese Patent Application No. 201610798359.7 dated Dec. 14, 2017, 9 pages.
International Search Report issued in corresponding International Application No. PCT/CN2016/107714, dated Mar. 10, 2017, 4 pages.
Extended European Search Report issued in corresponding EP Application No. EP, 17181232, dated Jan. 23, 2018, 9 pages.
Japanese Office Action issued in corresponding JP Patent Application No. 2017-504419, dated Nov. 15, 2018, 6 pages.

* cited by examiner

METHOD AND APPARATUS FOR TESTING VIRTUAL REALITY HEAD DISPLAY DEVICE

CROSS-REFERENCE TO RELATED APPLICATIONS

This application is based upon and claims priority to Chinese Patent Application No. 201610798359.7, filed on Aug. 31, 2016, the entire contents thereof are incorporated herein by reference.

TECHNICAL FIELD

The present disclosure generally relates to the field of testing technology, and more particularly, to a method and an apparatus for testing a virtual reality head display device.

BACKGROUND

A virtual reality (VR) head display device is a product integrating simulation technology and computer graphics man-machine interface technology, multimedia technology, sensor technology, network technology and other technologies. The principle thereof is allowing the user to see two images independent from each other with the user's left eye and right eye, by splitting an image to two images respectively corresponding to a left eye and a right eye of the user. In this way, through the lens of the virtual reality head display device, the user may watch images independent from each other which respectively correspond to his left and right eyes to experience a three-dimensional vision.

SUMMARY

According to a first aspect of the present disclosure, there is provided a method for testing a virtual reality head display device. The method may include: acquiring a pair of images corresponding to a test image from the virtual reality head display device, the pair of images including a left-eye image and a right-eye image generated by the virtual reality head display device corresponding to a test image; analyzing the pair of images to acquire sets of feature point positions, each set of feature point positions including a first position of a left-eye feature point in the left-eye image and a second position of a right-eye feature point in the right-eye image, the left-eye feature point and the right-eye feature point for each set having the same preset color value, the preset color value having a unique color value among color values of pixels in the test image; for each set of left-eye feature point and right-eye feature point, determining a difference between a first relative position of the left-eye feature point in the left-eye image and a second relative position of the right-eye feature point in the right-eye image according to the set of feature point positions; and determining a result regarding whether the virtual reality head display device is capable to generate a stereoscopic image observable by human eyes according to the difference between the first relative position and the second relative position.

According to a second aspect of the present disclosure, there is provided an apparatus for testing a virtual reality head display device. The apparatus include: a processor; and a memory for storing instructions executable by the processor. The processor is configured to perform acts including: acquiring a pair of images from the virtual reality head display device, the pair of images including a left-eye image and a right-eye image generated by the virtual reality head display device corresponding to a test image; analyzing the pair of images to acquire sets of feature point positions, each set of feature point positions including a first position of a left-eye feature point in the left-eye image and a second position of a right-eye feature point in the right-eye image, the left-eye feature point and the right-eye feature point for each set having the same preset color value, the preset color value having a unique color value among color values of pixels in the test image; for each set of left-eye feature point and right-eye feature point, determining a difference between a first relative position of the left-eye feature point in the left-eye image and a second relative position of the right-eye feature point in the right-eye image according to the set of feature point positions; and determining a result regarding whether the virtual reality head display device is capable to generate a stereoscopic image observable by human eyes according to the difference between the first relative position and the second relative position.

According to a third aspect of the present disclosure, there is provided a non-transitory computer-readable storage medium storing instructions, executable by a processor in an apparatus, for performing a method for testing a virtual reality head display device. The method includes: acquiring a pair images from the virtual reality head display device, the pair of images including a left-eye image and a right-eye image generated by the virtual reality head display device corresponding to a test image; analyzing the pair of images to acquire sets of feature point positions, each set of feature point positions including a first position of a left-eye feature point in the left-eye image and a second position of a right-eye feature point in the right-eye image, the left-eye feature point and the right-eye feature point for each set having the same preset color value, the preset color value having a unique color value among color values of pixels in the test image; for each set of left-eye feature point and right-eye feature point, determining a difference between a first relative position of the left-eye feature point in the left-eye image and a second relative position of the right-eye feature point in the right-eye image according to the set of feature point positions; and determining a result regarding whether the virtual reality head display device is capable to generate a stereoscopic image observable by human eyes according to the difference between the first relative position and the second relative position.

It is to be understood that both the foregoing general description and the following detailed description are exemplary only and are not restrictive of the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Figure 1:
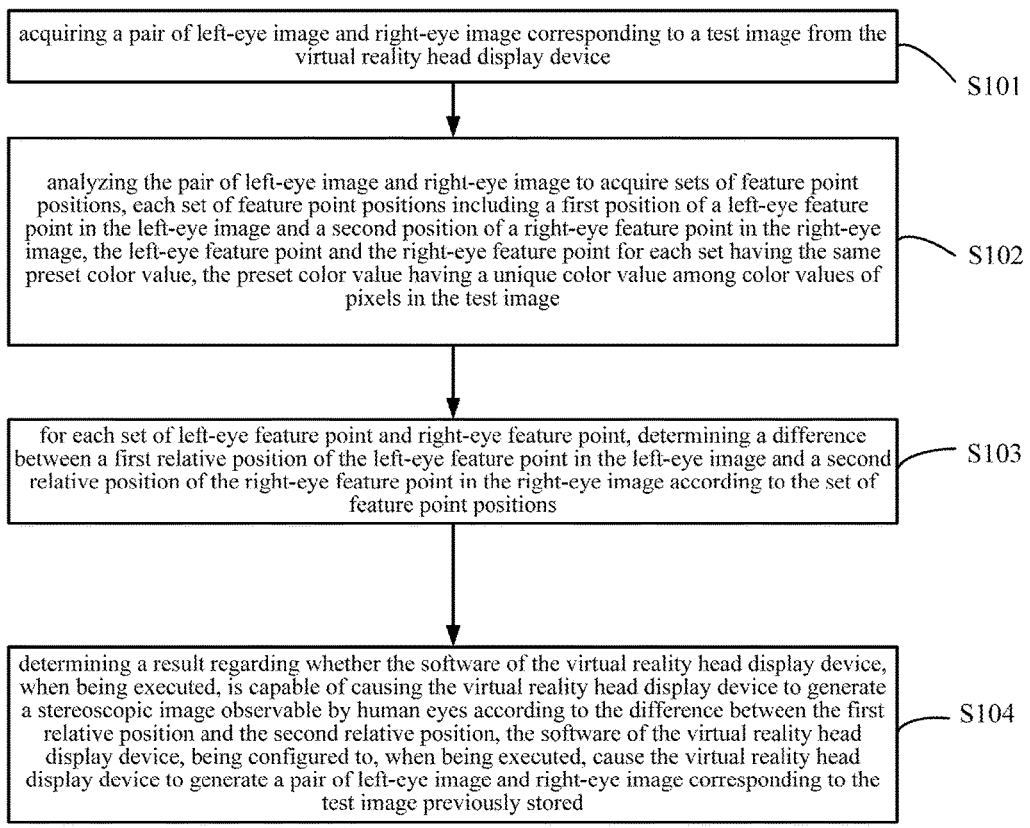
FIG. 1 is a flow chart illustrating a method for testing a virtual reality head display device according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Virtual reality, also known as virtual technology or virtual environment, is to produce a virtual world of a three-dimensional space by utilizing computer simulation. It may provide simulation of a sense such as a human vision for the user, and allow the user to feel as when in real life and to timely and unrestrictedly observe objects in the three-dimensional space. When the user moves, the computer may immediately perform complicated operation, to transmit back a precise video of the three-dimensional world, to present the user a sense of presence. This technology integrates latest developments of computer graphics, computer simulation, artificial intelligence, sensing, display and network parallel processing technology, and is a computer-assisted high-tech simulation system.

A virtual reality head display device is a head-mounted display, which generates different images for a left eye and for a right eye. Then, the user acquires different images with his eyes to experience a three-dimensional sense in his brain. Software of the virtual reality head display device is application software developed for the above mentioned virtual reality head display device, to generate different images for a left eye and a right eye and to generate a stereoscopic image in a human brain when the different images are observed by human eyes.

Virtual reality head display devices may be divided into three types: external head display devices, integrated head display devices and mobile head display devices. The external head display devices have excellent user experience. However, they require independent screens, have complex product structures, are technology intensive, and require support of hardware such PCs. The integrated head display devices, also known as VR integrated machines, have no requirement of external hardware devices, and may integrate display features and hardware in one head display. The mobile head display devices have simple structures and low prices, may be watched when put into mobile phones, and are convenient for users.

Any of the types of virtual reality head display devices has to present two different images for the left eye and the right eye of the user. It may be an important factor of a proper function of a virtual reality head display device and an important testing item of a virtual reality head display device whether a stereoscopic image observable by human eyes can be formed when the two images are observed by human eyes.

In related art, this item is conventionally tested manually. That is, by running a virtual reality head display device actually worn by a human tester, it may be directly estimated whether a stereoscopic image observable by human eyes may be formed. This testing method requires manual work, which may be time-consuming and have a high cost on human resources. In addition, with the human eyes, it can only make qualitative estimation, resulting in undesirable test accuracy and a large testing error. Moreover, different human testers may make different estimations, and thus the test method cannot meet the test consistency requirement.

In embodiments of the present disclosure, the software of the virtual reality head display device may, when being executed, cause the virtual reality head display device to generate a pair of images including a left-eye image and a right-eye image corresponding to a previously stored test image. The virtual reality head display device may generate multiple pairs of left-eye image and right-eye image for a plurality of times, and send the pairs of left-eye images and right-eye images corresponding to the test image to a test apparatus. The test apparatus may acquire a pair of images corresponding to the test image for a plurality of times from the virtual reality head display device. After each time the test apparatus acquires a pair of left-eye image and right-eye image, the test apparatus may analyze the pair of left-eye image and right-eye image to acquire sets of feature point positions. Each set of feature point positions include a first position of a left-eye feature point in the left-eye image and a second position of a right-eye feature point in the right-eye image. The left-eye feature point and the right-eye feature point are a pixel point in the left-eye image and a pixel point the right-eye image which respectively correspond to a certain pixel point in the test image. The test apparatus may determine a first relative position of the left-eye feature point in the left-eye image and a second relative position of the right-eye feature point in the right-eye image according to each set of feature point positions, and determine a deviation of the same pixel point in the left-eye image and in the right-eye image. Then, according to the deviation, the test apparatus may determine whether the left-eye image and the right-eye image may form a stereoscopic image when they are observed by the user. This means whether the software of the virtual reality head display device, when being executed, is capable of causing the virtual reality head display device to generate a stereoscopic image observable by human eye.

In one or more embodiments, the test does not require manual work. A result regarding whether the virtual reality head display device is capable to generate a stereoscopic image observable by human eyes may be automatically tested. It can save testing time, and cut down cost on human resources. Moreover, the test result is a quantitative position value, which significantly improves the test accuracy. The test standard may be made consistent, and the test method may be applied in various fields and may be applicable to test of software of various types of virtual reality head display devices.

FIG. 1 is a flow chart illustrating a method for testing a virtual reality head display device according to an exemplary embodiment. The method may test the software, the hardware, or both the software and hardware of the virtual reality head display device. As shown in FIG. 1, the method for testing a virtual reality head display device may be applied in a testing device, and include the following steps S101-S104.

At step S101, a pair of images corresponding to a test image are acquired from the virtual reality head display device. The pair of images include a left-eye image and a right-eye image. The pair of images may be acquired from the virtual reality head display device for a plurality of times. For example, the left-eye image and right-eye image may be generated by the virtual reality head display device using one or more test images.

To test a virtual reality head display device, the software of the virtual reality head display device may be executed, to cause the virtual reality head display device to generate a pair of images, i.e. a left-eye image and a right-eye image, for a pre-stored test image. The virtual reality head display device may send a currently generated pair of left-eye and right-eye images to a test apparatus at a certain time interval. However, it is also possible that the test apparatus may send an image requesting message to the virtual reality head display device at a certain time interval, and the virtual reality head display device may send a currently generated pair of left-eye and right-eye images to the test apparatus upon receipt of the image requesting message. As an example, the time interval may be 2 s.

Here, when the user moves with the virtual reality head display device, the software of the virtual reality head display device may be executed to cause the virtual reality head display device to perform complicated operation immediately according to a scene changed due to the movement of the user, to generate a left-eye image and a right-eye image after the movement, allowing the user to feel a sense of presence.

Therefore, in order to test the virtual reality head display device under circumstances that the test scene is being changed, the virtual reality head display device may be placed on a mechanical device which may automatically adjust the angle thereof. After the mechanical device is turned on, the angle of the virtual reality head display device may be automatically adjusted to change the scene. In this way, the virtual reality head display device may send to the test apparatus a pair of left-eye and right-eye images corresponding to the test image at each of various angles.

Alternatively or additionally, the virtual reality head display device may be provided with a signal that cause the sensor of the head display device simulate user moves. When different signals are provided, the angle of the virtual reality head display device may be automatically adjusted to change the scene.

At step S102, the pair of images are analyzed to acquire sets of feature point positions. Each set of feature point positions may include a first position of a left-eye feature point in the left-eye image and a second position of a right-eye feature point in the right-eye image. The left-eye feature point and the right-eye feature point for each set have the same preset color value, where the preset color value has a unique color value among color values of pixels in the test image.

Here, for the pair of left-eye image and right-eye image, the left-eye image and the right-eye image may be separately analyzed, to acquire a first position of a certain pixel of the test image in the left-eye image and a second position of the pixel in the right-eye image. In a pair of left-eye image and right-eye image, a first position of a pixel in the left-eye image and a second position of the pixel in the right-eye image are referred to as a set of feature point position.

In a virtual reality development environment, a certain pixel in the test image may be transformed as a pixel in the left-eye image and a pixel in the right-eye image respectively. The pixel in the test image, the corresponding pixel in the left-eye image and the corresponding pixel in the right-eye image have the same color value. Therefore, in one or more embodiments, according to a preset color value, the test apparatus may acquire a left-eye feature point and a right-eye feature point of the same preset color value respectively from the left-eye image and the right-eye image. Here, the preset color value may be a unique color value among the color values of all of the pixels in the test image. In other words, only one pixel in the test image has the preset color value. In this case, a left-eye feature point in the left-eye image which has the preset color value and the right-eye feature point in the right-eye image which has the preset color value are the same pixel, i.e. the pixel in the test image which has the preset color value.

In the disclosure, the preset color value may be input to the test apparatus by a test personnel. The test personnel may set a number of test points in the test image in the software of the virtual reality head display device. Each of the test points may have a unique preset color value that is different form any of the other pixels in the test image. Therefore, each of the test points may be identified by its unique preset color value. In addition, the test personnel may input these preset color values to the test apparatus, and the test apparatus may record these preset color values.

Here, the preset color values may be a RGB value representing a color of a pixel in a picture. The larger the RGB value is, the brighter the picture may be. For example, RGB (255, 255, 255) may represent white color, and RGB (0, 0, 0) may represent black color. It should be noted that, in practical application, Lab values may be used to represent color values. In one or more embodiments, the preset color value is a RGB value, for example. The RGB value may accurately represent a color value of a pixel. It may be convenient to set a preset color value with a RGB value, and it may be accurately and conveniently to determine positions of the same pixel in the left-eye image and in the right-eye image with the test apparatus, thus improving the test efficiency.

Therefore, the test apparatus may perform image analysis on the pair of left-eye and right-eye images, to acquire color values of the pixels in the left-eye image and color values of the pixels in the right-eye image, to acquire a left-eye feature point and a right-eye feature point which have the same preset color value. Each set of a left-eye feature point and a right-eye feature point which have the same preset color value may form a set of feature points. Thereby, the test apparatus may acquire a first position of the left-eye feature point in the left-eye image and a second position of the right-eye feature point in the right-eye image.

It should be noted that the test apparatus may store one, two or more preset color values. Therefore, the test apparatus may acquire one set of feature points or sets of feature points. Feature points in each set correspond to the same preset color value.

The test apparatus may acquire sets of feature point positions from one pair of left-eye image and right-eye image. Feature points in each set have the same preset color value. Each set of feature point positions may be indexed with a two-dimensional array formed by a reference number of the image and a color value of the feature point. As an example, when in a first pair of left-eye image and right-eye image, the left-eye image has a reference number 00 and the right-eye image has a reference number 01, "a[00][Color Value 1]-Position 1" means that a first position of a pixel point in the left-eye image which has a Color Value 1 is Position 1, and "a[01][Color Value 1]-Position 2" means that a second position of a pixel point in the right-eye image which has a Color Value 1 is Position 2.

At step S103, for each set of left-eye feature point and right-eye feature point, a difference between a first relative position of the left-eye feature point in the left-eye image and a second relative position of the right-eye feature point in the right-eye image is determined according to the set of feature point positions.

At step S104, a result regarding whether the virtual reality head display device is capable to generate a stereoscopic image observable by human eyes is determined according to the difference between the first relative position and the second relative position. The software of the virtual reality head display device, being configured to, when being executed, cause the virtual reality head display device to generate a pair of left-eye image and right-eye image corresponding to the test image previously stored. The test image may be stored in the virtual reality head display device. Alternatively or additionally, the test image may be stored in a device communicating with the virtual reality head display device.

Here, since a left-eye image and a right-eye image have a parallax in a horizontal direction, relative positions of the same pixel in a left-eye image and in a right-eye image may have a deviation from each other. When the deviation of relative positions of the same pixel in a left-eye image and in a right-eye image is within a particular range, the left-eye image and the right-eye image may form a stereoscopic image in a human brain after being observed by human eyes. When the deviation exceeds the particular range, the left-eye image and the right-eye image cannot form a stereoscopic image in a human brain after being observed by human eyes.

In one or more embodiments, the pair of images acquired by the test apparatus are generated from the test image previously stored through the software of the virtual reality head display device, where the pair of images include a left-eye image and a right-eye image. When the left-eye image and the right-eye image can form a stereoscopic image in a human brain after being observed by human eyes, it means that the virtual reality head display device may properly generate a stereoscopic image observable by human eyes. When the pair of images cannot form a stereoscopic image in a human brain after being observed by human eyes, it means that the virtual reality head display device is incapable of properly generating a stereoscopic image observable by human eyes. Therefore, according to the deviation between the first relative position of the left-eye feature point in the left-eye image and the second relative position of the right-eye feature point in the right-eye image, the test apparatus may determine whether the pair of left-eye image and right-eye image may form a stereoscopic image in a human brain after being observed by human eyes, and in turn, a result regarding whether the software of the virtual reality head display device, when being executed, is capable of causing the virtual reality head display device to generate a stereoscopic image observable by human eyes may be determined.

Here, when the deviation between the first relative position and the second relative position exceeds a deviation range for forming a stereoscopic image, it may be determined that the pair of left-eye image and right-eye image cannot form a stereoscopic image in a human brain after being observed by human eyes, and the result regarding whether the software of the virtual reality head display device, when being executed, is capable of causing the virtual reality head display device to generate a stereoscopic image observable by human eyes is that the software of the virtual reality head display device, when being executed, is incapable of causing the virtual reality head display device to properly generate a stereoscopic image observable by human eyes.

When the deviation between the first relative position and the second relative position is within a deviation range for forming a stereoscopic image, it may be determined that the pair of left-eye image and right-eye image can form a stereoscopic image in a human brain after being observed by human eyes, and the result regarding whether the software of the virtual reality head display device, when being executed, is capable of causing the virtual reality head display device to generate a stereoscopic image observable by human eyes is that the software of the virtual reality head display device, when being executed, is capable of causing the virtual reality head display device to properly generate a stereoscopic image observable by human eyes.

In one example, it may be assumed that the left lower corner of the left-eye image is an origin of a Cartesian coordinate system, the unit of the coordinate system is pixel, the horizontal direction is the x-axis, the vertical direction is the y-axis and the first position of the left-eye feature point in the left-eye image may be represented by a coordinate value. In this case, the first position of the left-eye feature point in the left-eye image which has a color value of Color Value 1 may be represented by a coordinate value of (24, 30), i.e., a [00] [Color Value 1]-Coordinate (24, 30).

In another example, it may be assumed that the left lower corner of the right-eye image is an origin of a Cartesian coordinate system, the unit of the coordinate system is pixel, the horizontal direction is the x-axis, the vertical direction is the y-axis and the second position of the right-eye feature point in the right-eye image may be represented by a coordinate value. In this case, the second position of the right-eye feature point in the right-eye image which has a color value of Color Value 1 may be represented by a coordinate value of (20, 30), i.e., a [01] [Color Value 1]-Coordinate (20, 30). In other words, the test apparatus may acquire that the first relative position of the left-eye feature point in the left-eye image is 24 pixels from the left lower corner of the left-eye image in the horizontal direction and 30 pixels from the left lower corner of the left-eye image in the vertical direction, and the second relative position of the right-eye feature point in the right-eye image is 20 pixels from the left lower corner of the right-eye image in the horizontal direction and 30 pixels from the left lower corner of the right-eye image in the vertical direction. Then, the deviation between the first relative position and the second relative position is that, compared with the second relative position of the right-eye feature point in the right-eye image, the position of the left-eye feature point in the left-eye image is deviated to the right for a deviation value of 4. The test apparatus may determine whether the software of the virtual reality head display device, when being executed, is capable of causing the virtual reality head display device to properly generate a stereoscopic image observable by human eyes according to whether the deviation value is within the deviation range for forming a stereoscopic image.

In one or more embodiments, a result regarding whether the software of the virtual reality head display device, when being executed, is capable of causing the virtual reality head display device to generate a stereoscopic image observable by human eyes may be automatically tested. It can save testing time, and cut down cost on human resources. Moreover, the test result is a quantitative position value, which significantly improves the test accuracy. The test standard may be made consistent, and the test method may be applied in various fields and may be applicable to test of software of various types of virtual reality head display devices.

In one aspect, the step S103 may include steps A1-A2.

At step A1, according to the set of feature point positions, a first distance between the left-eye feature point and a first border of the left-eye image and a second distance between the right-eye feature point and a second border of the right-eye image are determined, each of the first border and the second border being a left border, or each of the first border and the second border being a right border.

At step A2, a distance difference between the first distance and the second distance is calculated.

In one or more embodiments, when each of the first border and the second border is a left border, the first relative position of the left-eye feature point in the left-eye image is a first distance between the left-eye feature point and the left border of the left-eye image, and the second relative position of the right-eye feature point in the right-eye image is a second distance between the right-eye feature point and the left border of the right-eye image. In this case, the deviation between the first relative position and the second relative position is the distance difference between the first distance and the second distance.

Alternatively, when each of the first border and the second border is a right border, the first relative position of the left-eye feature point in the left-eye image is a first distance between the left-eye feature point and the right border of the left-eye image, and the second relative position of the right-eye feature point in the right-eye image is a second distance between the right-eye feature point and the right border of the right-eye image. In this case, the deviation between the relative position of the left-eye feature point in the left-eye image and the relative position of the right-eye feature point in the right-eye image is the distance difference between the first distance and the second distance.

For example, it may be assumed that the first position of the left-eye feature point in the left-eye image which has a color value of Color Value 1 is a coordinate (24, 30); the second position of the right-eye feature point in the right-eye image which has a color value of Color Value 1 is a coordinate (20, 30); the first distance is 24 pixels; the second distance is 20 pixels; and the distance difference is 4 pixels. A distance difference corresponding to each set of feature points may be stored as a two-dimensional array indexed by a reference number of pair of the images and the color value of the feature points. For example, the first pair of left-eye image and right-eye image has a reference number 0, a [0][Color Value 1]-4 means that the first pair of feature points in the first pair of left-eye image and right-eye image which has a color value of Color Value 1 corresponds to a distance difference of 4 pixels.

The left-eye image and the right-eye image have no parallax in the vertical direction. Therefore, in determining the relative position of the left-eye feature point in the left-eye image and the relative position of the right-eye feature point in the right-eye image, the vertical direction is not taken into consideration, and only the deviation in the horizontal direction is required to be determined.

After the distance difference is acquired by the testing device, it may be determined whether the software of the virtual reality head display device, when being executed, is capable of causing the virtual reality head display device to generate a stereoscopic image observable by human eyes according to the distance difference.

In one or more embodiments, the deviation of the same pixel in the left-eye image and in the right-eye image may be quantified as a distance difference between a first distance and a second distance. It can simplify the calculation.

In one aspect, the step S104 may include step B1.

At step B1, it is determined that the software of the virtual reality head display device does not satisfy a condition of, when being executed, causing the virtual reality head display device to generate a stereoscopic image observable by human eyes when it is determined that the distance difference between the first distance and the second distance is not within a preset range according to any one set of feature points.

In one or more embodiments, when the deviation of the relative positions of the same pixel point in the left-eye image and in the right-eye image is within the preset range, the left-eye image and the right-eye image may form a stereoscopic image in a human brain when being observed by human eyes.

In one or more embodiments, for any set of feature points, after step A1 and A2, when it is determined that the distance difference between the first distance and the second distance is not within the preset range according to the positions of the feature points in the set, it may be determined that the left-eye image and the right-eye image generated through the software of the virtual reality head display device cannot form a stereoscopic image in a human brain. That is, it may be determined that the software of the virtual reality head display device, when being executed, is incapable of causing the virtual reality head display device to generate a stereoscopic image observable by human eyes.

In one or more embodiments, it may be determined that the software of the virtual reality head display device does not satisfy the condition of, when being executed, causing the virtual reality head display device to generate a stereoscopic image observable by human eyes when being executed when it is determined that the distance difference between the first distance and the second distance is not within the preset range according to any one set of feature points. It can improve the test accuracy.

In one aspect, the method also includes a step C1.

At step C1, it is determined that the software of the virtual reality head display device satisfies a condition of, when being executed, causing the virtual reality head display device to generate a stereoscopic image observable by human eyes when it is determined that, for each of N pairs of left-eye images and right-eye images acquired, the distance difference between the first distance and the second distance is within a preset range according to each set of feature points, wherein N is an integer larger than or equal to 1.

In one or more embodiments, the virtual reality head display device may send N pairs of left-eye images and right-eye images to the test apparatus. For each pair of images received by the test apparatus, the left-eye image and the right-eye image may be analyzed to acquire sets of positions of feature points corresponding to the left-eye image and the right-eye image. According to each set of feature point positions, a distance difference between the first distance and the second distance may be determined. When the distance difference between the first distance and the second distance which is determined for each set of feature point positions is within the preset range, a next pair of images are analyzed to acquire corresponding sets of feature points, and a distance difference between the first distance and the second distance may be determined according to each set of feature point positions. The process may be proceeded until for each of the N pairs of left-eye images and right-eye images, according to each set of feature point positions, the distance difference between the first distance and the second distance is within the preset range, it may be determined that the software of the virtual reality head display device satisfies the condition of, when being executed, causing the virtual reality head display device to generate a stereoscopic image observable by human eyes when being executed.

Here, the number N may be selected according to practical situation, considering both of the test accuracy and the test efficiency. When more emphasis is put on the test accuracy, the value of N may be selected relatively larger. Alternatively, when more emphasis is put on the test efficiency, the value of N may be selected relatively smaller. This is not limited herein. As an example, N may be set to a value 10 when considering both of the test accuracy and the test efficiency.

In one or more embodiments, the number of pairs of left-eye images and right-eye images to be acquired may be limited. The test result may be determined after tests on the limited pairs of left-eye images and right-eye images are completed. It can provide desirable test accuracy and test efficiency.

In one aspect, the method may also include steps D1-D2.

At step D1, the test image is acquired.

At step D2, the test image is analyzed to acquire the preset color value.

In one or more embodiments, the virtual reality head display device may send the test image to the test apparatus, and after the test apparatus receives the test image, the test apparatus may analyze the test image, to acquire color values respectively corresponding to the pixel points in the test image. Then, from the color values, a color value which has uniqueness is selected as a preset color value. That is, only one of the pixel points has the preset color value.

In one or more embodiments, the test apparatus may analyze the test image automatically, to obtain the preset color value without requiring input from the test personnel. It can save manual operation for the test personal, and reduce cost on human resources.

When among the N pairs of left-eye images and right-eye images, any two pairs have the same left-eye image and right-eye image, the test apparatus will repeatedly analyze and calculate the same two pairs of left-eye image and right-eye image. Therefore, in order to reduce unnecessary analysis and calculation, in one aspect, the N pairs of left-eye images and right-eye images are different from one another.

In one or more embodiments, the virtual reality head display device may be triggered to generate a pair of images and send them to the test apparatus when the scene is changed. The pair of images include a left-eye image and a right-eye image. Then, the N pairs of left-eye images and right-eye images received by the test apparatus may be different from one another. Therefore, the test apparatus may analyze different pairs of left-eye images and right-eye images to calculate distance differences corresponding sets of feature points. Then, a result regarding whether the software of the virtual reality head display device, when being executed, is capable of causing the virtual reality head display device to generate a stereoscopic image observable by human eyes may be determined according to the distance differences.

In one or more embodiments, the N different pairs of left-eye images and right-eye images may be analyzed to test the software of the virtual reality head display device. It can reduce unnecessary analysis and calculation, and can improve the test efficiency and the test accuracy.

The implementation process will be described in detail below with reference to some embodiments.

Figure 2:
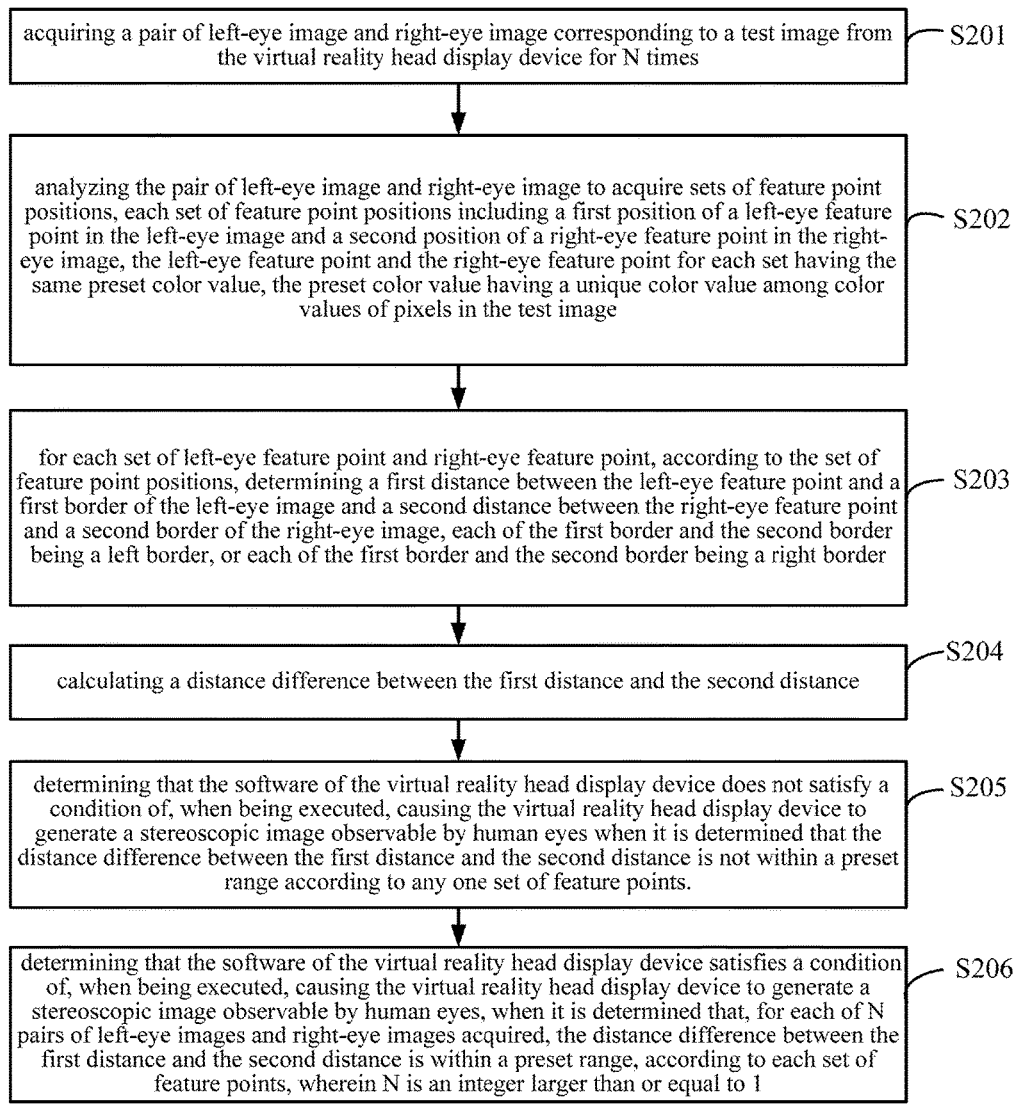
FIG. 2 is a flow chart illustrating a method for testing a virtual reality head display device according to an exemplary embodiment.

FIG. 2 is a flow chart illustrating a method for testing software of a virtual reality head display device according to an exemplary embodiment. As shown in FIG. 2, the method may be implemented by an apparatus which has image processing capability. The method includes the following steps.

At step S201, a pair of images corresponding to a test image is acquired from the virtual reality head display device for N times. The pair of images include a left-eye image and a right-eye image.

At step S202, the pair of images are analyzed to acquire sets of feature point positions, each set of feature point positions including a first position of a left-eye feature point in the left-eye image and a second position of a right-eye feature point in the right-eye image, the left-eye feature point and the right-eye feature point for each set having the same preset color value, the preset color value having a unique color value among color values of pixels in the test image.

At step S203, for each set of left-eye feature point and right-eye feature point, according to the set of feature point positions, a first distance between the left-eye feature point and a first border of the left-eye image and a second distance between the right-eye feature point and a second border of the right-eye image are determined, each of the first border and the second border being a left border, or each of the first border and the second border being a right border.

At step S204, a distance difference between the first distance and the second distance is calculated.

At step S205, it is determined that the software of the virtual reality head display device does not satisfy a condition of, when being executed, causing the virtual reality head display device to generate a stereoscopic image observable by human eyes when it is determined that the distance difference between the first distance and the second distance is not within a preset range according to any one set of feature points. Accordingly, it is determined that the virtual reality head display device does not satisfy a condition to generate a stereoscopic image observable by human eyes when it is determined that the distance difference between the first distance and the second distance is not within the preset range according to any one set of feature points.

At step S206, it is determined that the software of the virtual reality head display device satisfies a condition of, when being executed, causing the virtual reality head display device to generate a stereoscopic image observable by human eyes when it is determined that, for each of N pairs of left-eye images and right-eye images acquired, the distance difference between the first distance and the second distance is within a preset range according to each set of feature points, where N is an integer larger than or equal to 1. Accordingly, it is determined that the virtual reality head display device satisfies a condition to generate a stereoscopic image observable by human eyes when it is determined that, for each of N pairs of left-eye images and right-eye images acquired, the distance difference between the first distance and the second distance is within the preset range according to each set of feature points.

Figure 3:
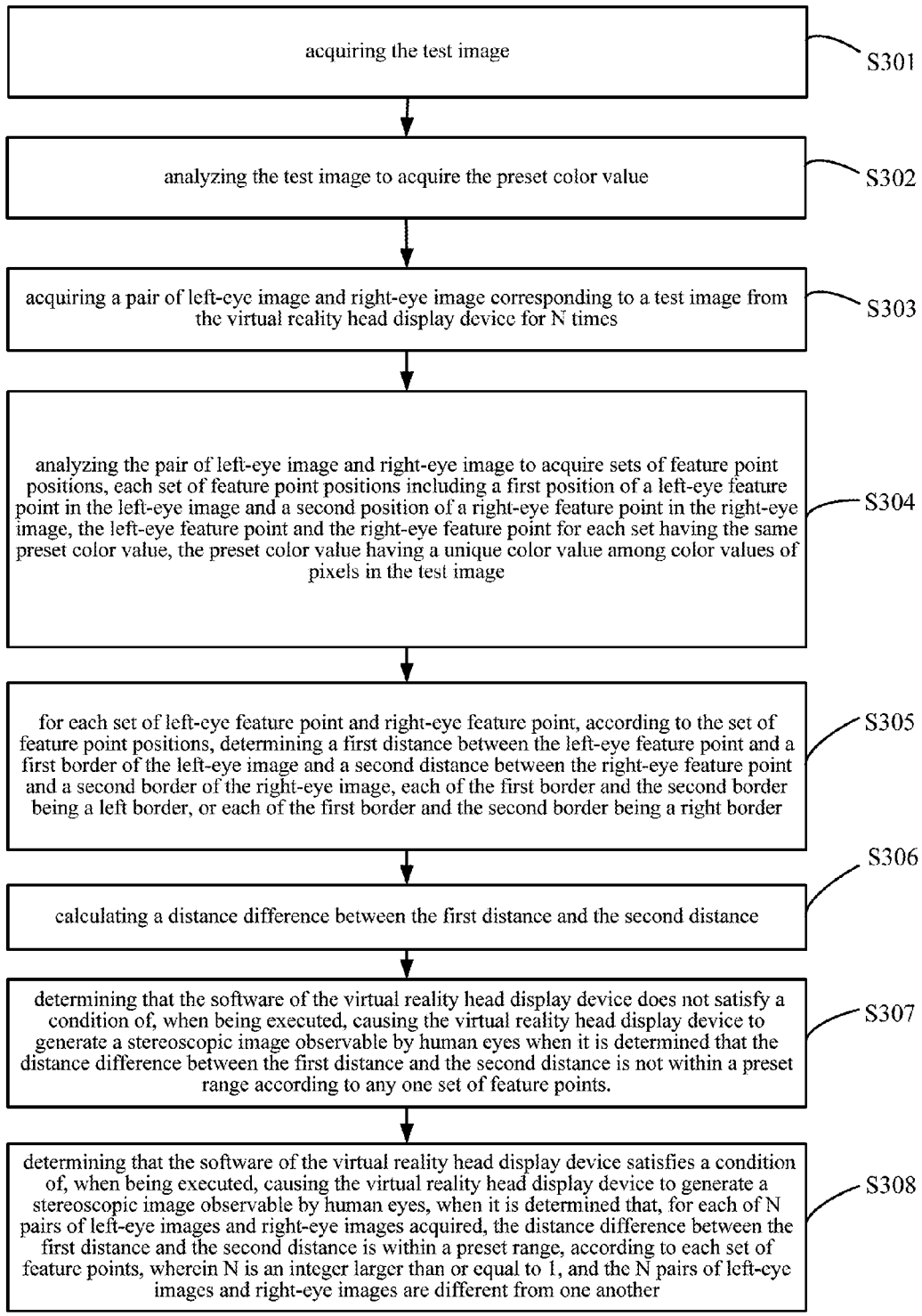
FIG. 3 is a flow chart illustrating a method for testing a virtual reality head display device according to an exemplary embodiment.

FIG. 3 is a flow chart illustrating a method for testing software of a virtual reality head display device according to an exemplary embodiment. As shown in FIG. 3, the method may be implemented by an apparatus which has image processing capability. The method includes the following steps.

At step S301, a test image is acquired.

At step S302, the test image is analyzed to acquire a preset color value.

At step S303, a pair of left-eye image and right-eye image corresponding to a test image is acquired from the virtual reality head display device for N times. Here, the pair of left-eye image and right-eye image may refer to the pair of images including a left-eye image and a right-eye image.

At step S304, the pair of images are analyzed to acquire sets of feature point positions, each set of feature point positions including a first position of a left-eye feature point in the left-eye image and a second position of a right-eye feature point in the right-eye image, the left-eye feature point and the right-eye feature point for each set having the same preset color value, the preset color value having a unique color value among color values of pixels in the test image.

At step S305, for each set of left-eye feature point and right-eye feature point, according to the set of feature point positions, a first distance between the left-eye feature point and a first border of the left-eye image and a second distance between the right-eye feature point and a second border of the right-eye image are determined, each of the first border and the second border being a left border, or each of the first border and the second border being a right border.

At step S306, a distance difference between the first distance and the second distance is calculated.

At step S307, it is determined that the software of the virtual reality head display device does not satisfy a condition of, when being executed, causing the virtual reality head display device to generate a stereoscopic image observable by human eyes when it is determined that the distance difference between the first distance and the second distance is not within a preset range according to any one set of feature points.

At step S308, it is determined that the software of the virtual reality head display device satisfies a condition of, when being executed, causing the virtual reality head display device to generate a stereoscopic image observable by human eyes when it is determined that, for each of N pairs of left-eye images and right-eye images acquired, the distance difference between the first distance and the second distance is within a preset range according to each set of feature points, wherein N is an integer larger than or equal to 1, and the N pairs of left-eye images and right-eye images are different from one another.

The following is an embodiment of an apparatus provided by the present disclosure, which may be configured to implement embodiments of the disclosed method.

Figure 4:
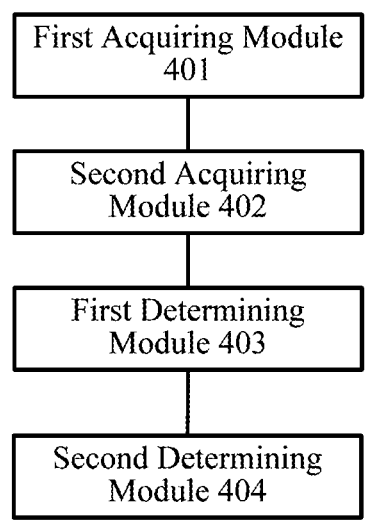
FIG. 4 is a block diagram illustrating an apparatus for testing a virtual reality head display device according to an exemplary embodiment.

FIG. 4 is a block diagram illustrating an apparatus for testing software of a virtual reality head display device according to an exemplary embodiment. The apparatus may be implemented as a part or the whole of an electronic device through software, hardware or combination of both. As shown in FIG. 4, the apparatus for testing software of a virtual reality head display device includes a first acquiring module 401, a second acquiring module 402, a first determining module 403 and a second determining module 404.

The first acquiring module 401 is configured to acquire a pair of left-eye image and right-eye image corresponding to a test image from the virtual reality head display device for a plurality of times.

The second acquiring module 402 is configured to analyze the pair of left-eye image and right-eye image to acquire sets of feature point positions, each set of feature point positions including a first position of a left-eye feature point in the left-eye image and a second position of a right-eye feature point in the right-eye image, the left-eye feature point and the right-eye feature point for each set having the same preset color value, the preset color value having a unique color value among color values of pixels in the test image.

The first determining module 403 is configured to, for each set of left-eye feature point and right-eye feature point, determine a difference between a first relative position of the left-eye feature point in the left-eye image and a second relative position of the right-eye feature point in the right-eye image according to the set of feature point positions.

The second determining module 404 is configured to determine a result regarding whether the software of the virtual reality head display device, when being executed, is capable of causing the virtual reality head display device to generate a stereoscopic image observable by human eyes according to the difference between the first relative position and the second relative position, the software of the virtual reality head display device being configured to, when being executed, cause the virtual reality head display device to generate a pair of left-eye image and right-eye image corresponding to the test image.

Figure 5:
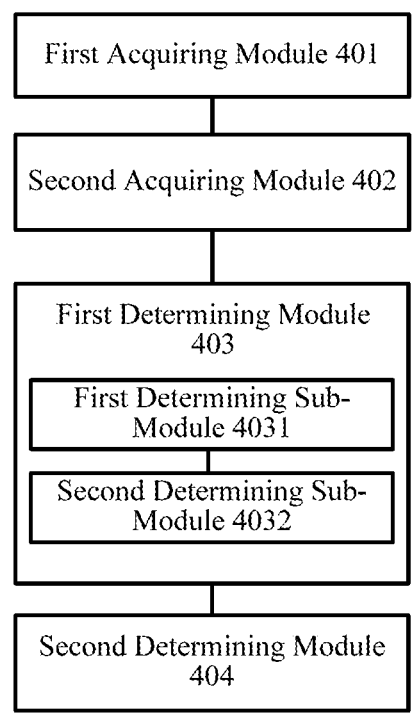
FIG. 5 is a block diagram illustrating an apparatus for testing a virtual reality head display device according to an exemplary embodiment.

In one aspect, as shown in FIG. 5, the first determining module 403 includes a first determining sub-module 4031 and a second determining sub-module 4032.

The first determining sub-module 4031 is configured to, according to each set of feature point positions, determine a first distance between the left-eye feature point and a first border of the left-eye image and a second distance between the right-eye feature point and a second border of the right-eye image, each of the first border and the second border being a left border, or each of the first border and the second border being a right border.

The second determining sub-module 4032 is configured to calculate a distance difference between the first distance and the second distance.

Figure 6:
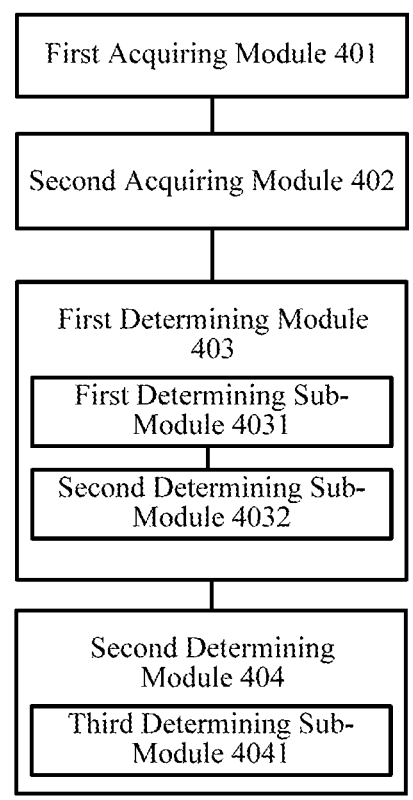
FIG. 6 is a block diagram illustrating an apparatus for testing a virtual reality head display device according to an exemplary embodiment.

In one aspect, as shown in FIG. 6, the second determining module 404 includes a third determining sub-module 4041. The third determining sub-module 4041 is configured to determine that the software of the virtual reality head display device does not satisfy a condition of, when being executed, causing the virtual reality head display device to generate a stereoscopic image observable by human eyes when it is determined that the distance difference between the first distance and the second distance is not within a preset range according to any one set of feature points.

Figure 7:
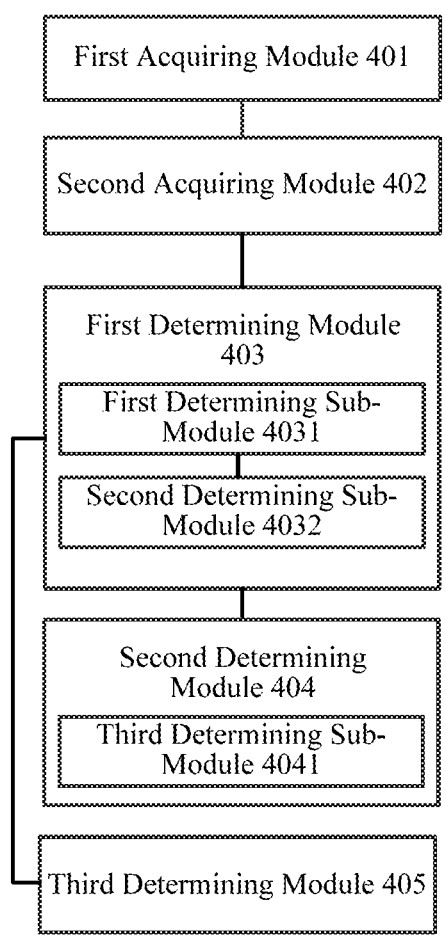
FIG. 7 is a block diagram illustrating an apparatus for testing a virtual reality head display device according to an exemplary embodiment.

In one aspect, as shown in FIG. 7, the apparatus further includes a third determining module 405. The third determining module 405 is configured to determine that the software of the virtual reality head display device satisfies a condition of, when being executed, causing the virtual reality head display device to generate a stereoscopic image observable by human eyes when it is determined that, for each of N pairs of left-eye images and right-eye images acquired, the distance difference between the first distance and the second distance is within a preset range according to each set of feature points, wherein N is an integer larger than or equal to 1.

In one aspect, the preset color value is a RGB value.

Figure 8:
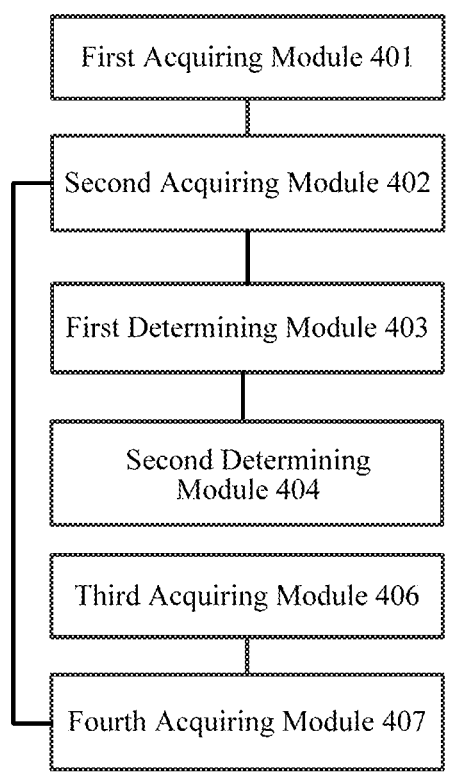
FIG. 8 is a block diagram illustrating an apparatus for testing a virtual reality head display device according to an exemplary embodiment.

In one aspect, as shown in FIG. 8, the apparatus further includes a third acquiring module 406 and a fourth acquiring module 407.

The third acquiring module 406 is configured to acquire the test image.

The fourth acquiring module 407 is configured to analyze the test image to acquire the preset color value.

In one aspect, the N pairs of left-eye images and right-eye images are different from one another.

With respect to the apparatus in the above embodiments, the specific manners for performing operations for individual modules therein have been described in detail in one or more embodiments regarding the relevant methods, which will not be elaborated herein.

Figure 9:
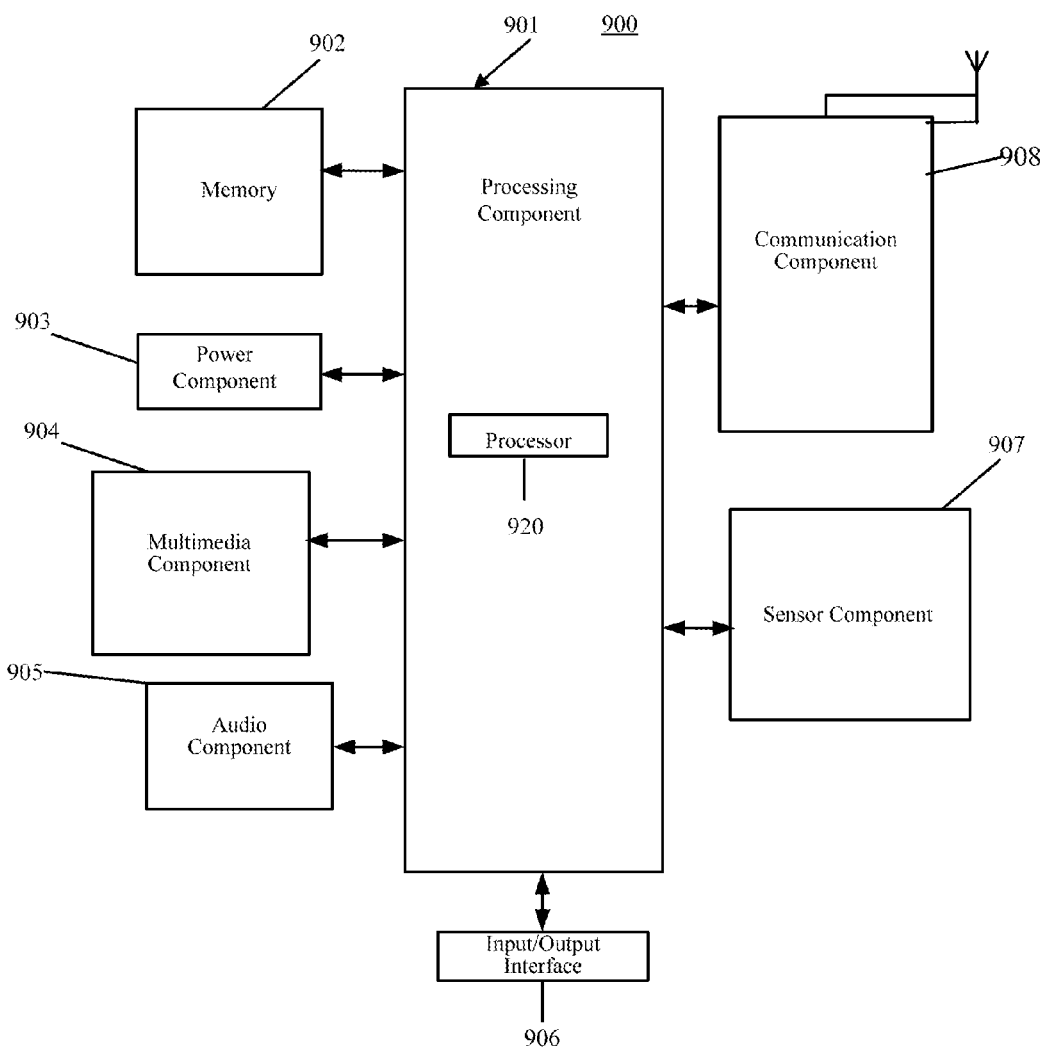
FIG. 9 is a block diagram illustrating an apparatus for testing a virtual reality head display device according to an exemplary embodiment.

FIG. 9 is a block diagram illustrating an apparatus for testing software of a virtual reality head display device according to an exemplary embodiment. The apparatus may be applicable in a terminal device. For example, the apparatus 900 can be a mobile phone, a gaming console, a computer, a tablet, a personal digital assistant or the like.

The apparatus 900 can include one or more of the following components: a processing component 901, a memory 902, a power component 903, a multimedia component 904, an audio component 905, an input/output (I/O) interface 906, a sensor component 907, and a communication component 908.

The processing component 901 typically controls overall operations of the apparatus 900, such as the operations associated with display, telephone calls, data communications, camera operations, and recording operations. The processing component 901 can include one or more processors 920 to execute instructions to perform all or part of the steps in the above described methods. Moreover, the processing component 901 can include one or more modules which facilitate the interaction between the processing component 901 and other components. For instance, the processing component 901 can include a multimedia module to facilitate the interaction between the multimedia component 904 and the processing component 901.

The memory 902 is configured to store various types of data to support the operation of the apparatus 900. Examples of such data include instructions for any applications or methods operated on the apparatus 900, contact data, phonebook data, messages, pictures, video, etc. The memory 902 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 903 provides power to various components of the apparatus 900. The power component 903 can include a power management system, one or more power sources, and any other components associated with the generation, management, and distribution of power in the apparatus 900.

The multimedia component 904 includes a screen providing an output interface between the apparatus 900 and the user. In some embodiments, the screen can include a liquid crystal display (LCD) and a touch panel (TP). When the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 904 includes a front camera and/or a rear camera. The front camera and the rear camera can receive an external multimedia datum while the apparatus 900 is in an operation mode, such as a photographing mode or a video mode. Each of the front camera and the rear camera can be a fixed optical lens system or have focus and optical zoom capability.

The audio component 905 is configured to output and/or input audio signals. For example, the audio component 905 includes a microphone ("MIC") configured to receive an external audio signal when the apparatus 900 is in an operation mode, such as a call mode, a recording mode, and a voice recognition mode. The received audio signal can be further stored in the memory 902 or transmitted via the communication component 908. In some embodiments, the audio component 905 further includes a speaker to output audio signals.

The I/O interface 906 provides an interface between the processing component 901 and peripheral interface modules, such as a keyboard, a click wheel, buttons, and the like. The buttons can include, but are not limited to, a home button, a volume button, a starting button, and a locking button.

The sensor component 907 includes one or more sensors to provide status assessments of various aspects of the apparatus 900. For instance, the sensor component 907 can detect an open/closed status of the apparatus 900, relative positioning of components, e.g., the display and the keypad, of the apparatus 900, a change in position of the apparatus 900 or a component of the apparatus 900, a presence or absence of user contact with the apparatus 900, an orientation or an acceleration/deceleration of the apparatus 900, and a change in temperature of the apparatus 900. The sensor component 907 can include a proximity sensor configured to detect the presence of nearby objects without any physical contact. The sensor component 907 can also include a light sensor, such as a CMOS or CCD image sensor, for use in imaging applications. In some embodiments, the sensor component 907 can also include an accelerometer sensor, a gyroscope sensor, a magnetic sensor, a pressure sensor, or a temperature sensor.

The communication component 908 is configured to facilitate communication, wired or wirelessly, between the apparatus 900 and other devices. The apparatus 900 can access a wireless network based on a communication standard, such as WiFi, 2G, or 3G, or a combination thereof. In one exemplary embodiment, the communication component 908 receives a broadcast signal or broadcast associated information from an external broadcast management system via a broadcast channel. In one exemplary embodiment, the communication component 908 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 900 can be implemented with one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus 900 may use the circuitries in combination with the other hardware or software components for executing the method above. Each module, sub-module, unit, or sub-unit disclosed above may be implemented at least partially using the one or more circuitries.

In exemplary embodiments, there is also provided a non-transitory computer-readable storage medium including instructions, such as included in the memory 902, executable by the processor 920 in the apparatus 900, for performing the above-described methods. For example, the non-transitory computer-readable storage medium can be a ROM, a RAM, a CD-ROM, a magnetic tape, a floppy disc, an optical data storage device, and the like.

An apparatus for testing software of a virtual reality head display device, including: a processor; and a memory for storing instructions executable by the processor. The processor is configured to perform acts including:

acquiring a pair of left-eye image and right-eye image corresponding to a test image from the virtual reality head display device;

analyzing the pair of left-eye image and right-eye image to acquire sets of feature point positions, each set of feature point positions including a first position of a left-eye feature point in the left-eye image and a second position of a right-eye feature point in the right-eye image, the left-eye feature point and the right-eye feature point for each set having the same preset color value, the preset color value having a unique color value among color values of pixels in the test image;

for each set of left-eye feature point and right-eye feature point, determining a difference between a first relative position of the left-eye feature point in the left-eye image and a second relative position of the right-eye feature point in the right-eye image according to the set of feature point positions; and determining a result regarding whether the software of the virtual reality head display device, when being executed, is capable of causing the virtual reality head display device to generate a stereoscopic image observable by human eyes according to the difference between the first relative position and the second relative position. Here, the software of the virtual reality head display device, when being executed, cause the virtual reality head display device to generate a pair of left-eye image and right-eye image corresponding to the test image.

The processor is also configured to perform:

determining a difference between a first relative position of the left-eye feature point in the left-eye image and a second relative position of the right-eye feature point in the right-eye image according to the set of feature point positions, includes:

according to the set of feature point positions, determining a first distance between the left-eye feature point and a first border of the left-eye image and a second distance between the right-eye feature point and a second border of the right-eye image, each of the first border and the second border being a left border, or each of the first border and the second border being a right border; and calculating a distance difference between the first distance and the second distance.

The processor is also configured to perform:

determining a result regarding whether the software of the virtual reality head display device, when being executed, is capable of causing the virtual reality head display device to generate a stereoscopic image observable by human eyes according to the difference between the first relative position and the second relative position, includes:

determining that the software of the virtual reality head display device does not satisfy a condition of, when being executed, causing the virtual reality head display device to generate a stereoscopic image observable by human eyes when it is determined that the distance difference between the first distance and the second distance is not within a preset range according to any one set of feature points.

The processor is also configured to perform acts including:

determining that the virtual reality head display device satisfies a condition to generate a stereoscopic image observable by human eyes when it is determined that, for each of N pairs of left-eye images and right-eye images acquired, the distance difference between the first distance and the second distance is within a preset range according to each set of feature points, wherein N is an integer larger than or equal to 1.

The processor is also configured to perform acts including:

acquiring the test image; and analyzing the test image to acquire the preset color value.

The processor is also configured to:

the N pairs of left-eye images and right-eye images are different from one another.

A non-transitory computer readable storage medium, when instructions in the storage medium are executed by the processor of the apparatus 900, the apparatus 900 is enabled to perform the above method for testing software of a virtual reality head display device. The method includes:

acquiring a pair of left-eye image and right-eye image corresponding to a test image from the virtual reality head display device for a plurality of times;

analyzing the pair of left-eye image and right-eye image to acquire sets of feature point positions, each set of feature point positions including a first position of a left-eye feature point in the left-eye image and a second position of a right-eye feature point in the right-eye image, the left-eye feature point and the right-eye feature point for each set having the same preset color value, the preset color value having a unique color value among color values of pixels in the test image;

for each set of left-eye feature point and right-eye feature point, determining a difference between a first relative position of the left-eye feature point in the left-eye image and a second relative position of the right-eye feature point in the right-eye image according to the set of feature point positions; and determining a result regarding whether the software of the virtual reality head display device, when being executed, is capable of causing the virtual reality head display device to generate a stereoscopic image observable by human eyes according to the difference between the first relative position and the second relative position, the software of the virtual reality head display device, being configured to, when being executed, cause the virtual reality head display device to generate a pair of left-eye image and right-eye image corresponding to a previously stored test image.

The instructions in the storage medium may also include:

determining a difference between a first relative position of the left-eye feature point in the left-eye image and a second relative position of the right-eye feature point in the right-eye image according to the set of feature point positions, includes:

according to the set of feature point positions, determining a first distance between the left-eye feature point and a first border of the left-eye image and a second distance between the right-eye feature point and a second border of the right-eye image, each of the first border and the second border being a left border, or each of the first border and the second border being a right border; and calculating a distance difference between the first distance and the second distance.

The instructions in the storage medium may also include:

determining a result regarding whether the software of the virtual reality head display device, when being executed, is capable of causing the virtual reality head display device to generate a stereoscopic image observable by human eyes according to the difference between the first relative position and the second relative position, includes:

determining that the software of the virtual reality head display device does not satisfy a condition of, when being executed, causing the virtual reality head display device to generate a stereoscopic image observable by human eyes when it is determined that the distance difference between the first distance and the second distance is not within a preset range according to any one set of feature points.

The instructions in the storage medium may also include: the method further includes:

determining that the software of the virtual reality head display device satisfies a condition of, when being executed, causing the virtual reality head display device to generate a stereoscopic image observable by human eyes when it is determined that, for each of N pairs of left-eye images and right-eye images acquired, the distance difference between the first distance and the second distance is within a preset range according to each set of feature points, wherein N is an integer larger than or equal to 1.

The instructions in the storage medium may also include: the method further includes:

acquiring the test image; and analyzing the test image to acquire the preset color value.

Figure 10:
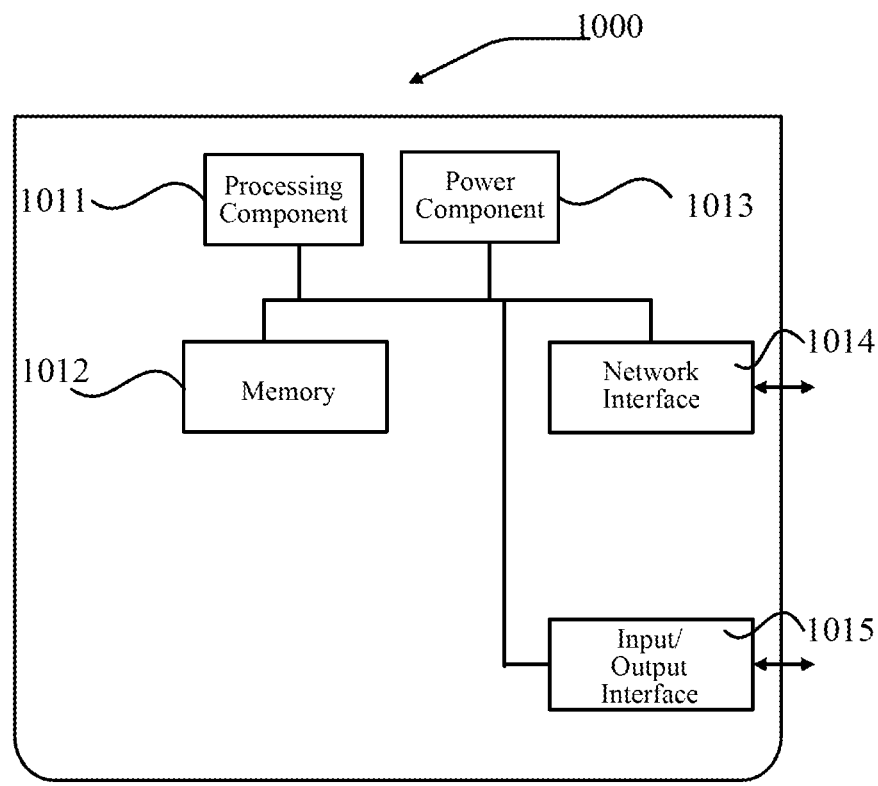
FIG. 10 is a block diagram illustrating an apparatus for testing a virtual reality head display device according to an exemplary embodiment.

FIG. 10 is a block diagram of an apparatus 1000 for testing software of a virtual reality head display device according to an exemplary embodiment. For example, the apparatus 1000 may be provided as a computer. The apparatus 1000 includes a processing component 1011 that further includes one or more processors, and memory resources represented by a memory 1012 for storing instructions executable by the processing component 1011, such as application programs. The application programs stored in the memory 1012 may include one or more modules each corresponding to a set of instructions. Further, the processing component 1011 is configured to execute the instructions to perform the above described method.

The apparatus 1000 may also include a power component 1013 configured to perform power management of the apparatus 1000, wired or wireless network interface(s) 1014 configured to connect the apparatus 1000 to a network, and an input/output (I/O) interface 1015. The apparatus 1000 may operate based on an operating system stored in the memory 1012, such as Windows Server™, Mac OS X™, Unix™, Linux™, FreeBSD™, or the like.

The technical solution provided by one or more embodiments of the present disclosure may bring about the following beneficial effects. According to one or more embodiments, a result regarding whether the software of the virtual reality head display device, when being executed, is capable of causing the virtual reality head display device to generate a stereoscopic image observable by human eyes may be automatically tested. It can save testing time, and cut down cost on human resources. Moreover, the test result is a quantitative position value, which significantly improves the test accuracy. The test standard may be made consistent, and the test method may be applied in various fields and may be applicable to test of software of various types of virtual reality head display devices.

In one aspect, determining a difference between a first relative position of the left-eye feature point in the left-eye image and a second relative position of the right-eye feature point in the right-eye image according to the set of feature point positions, includes:

according to the set of feature point positions, determining a first distance between the left-eye feature point and a first border of the left-eye image and a second distance between the right-eye feature point and a second border of the right-eye image, each of the first border and the second border being a left border, or each of the first border and the second border being a right border; and calculating a distance difference between the first distance and the second distance.

The technical solution provided by one or more embodiments of the present disclosure may bring about the following beneficial effects. According to one or more embodiments, the relative position of the same pixel in the left-eye image and in the right-eye image may be quantified as a distance difference between a first distance and a second distance. It can simplify the calculation.

In one aspect, determining a result regarding whether the software of the virtual reality head display device, when being executed, is capable of causing the virtual reality head display device to generate a stereoscopic image observable by human eyes according to the difference between the first relative position and the second relative position, includes:

determining that the software of the virtual reality head display device does not satisfy a condition of, when being executed, causing the virtual reality head display device to generate a stereoscopic image observable by human eyes, when it is determined that the distance difference between the first distance and the second distance is not within a preset range according to any one set of feature points.

The technical solution provided by one or more embodiments of the present disclosure may bring about the following beneficial effects. According to one or more embodiments, it may be determined that the software of the virtual reality head display device does not satisfy a condition of, when being executed, causing the virtual reality head display device to generate a stereoscopic image observable by human eyes when it is determined that the distance difference between the first distance and the second distance is not within a preset range according to any one set of feature points. It can improve the test accuracy.

In one aspect, the method further includes:

determining that the software of the virtual reality head display device satisfies a condition of, when being executed, causing the virtual reality head display device to generate a stereoscopic image observable by human eyes when it is determined that, for each of N pairs of left-eye images and right-eye images acquired, the distance difference between the first distance and the second distance is within a preset range according to each set of feature points, wherein N is an integer larger than or equal to 1.

The technical solution provided by one or more embodiments of the present disclosure may bring about the following beneficial effects. According to one or more embodiments, the number of pairs of left-eye images and right-eye images to be acquired may be limited. The test result may be determined after tests on the limited pairs of left-eye images and right-eye images are completed. It can provide desirable test accuracy and test efficiency.

In one aspect, the method further includes:
acquiring the test image; and
analyzing the test image to acquire the preset color value.

The technical solution provided by one or more embodiments of the present disclosure may bring about the following beneficial effects. According to one or more embodiments, the test apparatus may analyze the test image automatically, to obtain the preset color value without requiring input from a test personnel. It can save manual operation for the test personal, and reduce cost on human resources.

In one aspect, the N pairs of left-eye images and right-eye images are different from one another.

The technical solution provided by one or more embodiments of the present disclosure may bring about the following beneficial effects. According to one or more embodiments, the N different pairs of left-eye images and right-eye images may be analyzed to test the software of the virtual reality head display device. It can reduce unnecessary analysis and calculation, and can improve the test efficiency and the test accuracy.

According to a second aspect of the present disclosure, there is provided an apparatus for testing software of a virtual reality head display device, including:
a first acquiring module configured to acquire a pair of left-eye image and right-eye image corresponding to a test image from the virtual reality head display device for a plurality of times;
a second acquiring module configured to analyze the pair of left-eye image and right-eye image to acquire sets of feature point positions, each set of feature point positions including a first position of a left-eye feature point in the left-eye image and a second position of a right-eye feature point in the right-eye image, the left-eye feature point and the right-eye feature point for each set having the same preset color value, the preset color value having a unique color value among color values of pixels in the test image;
a first determining module configured to, for each set of left-eye feature point and right-eye feature point, determine a difference between a first relative position of the left-eye feature point in the left-eye image and a second relative position of the right-eye feature point in the right-eye image according to the set of feature point positions; and
a second determining module configured to determine a result regarding whether the software of the virtual reality head display device, when being executed, is capable of causing the virtual reality head display device to generate a stereoscopic image observable by human eyes according to the difference between the first relative position and the second relative position, the software of the virtual reality head display device being configured to, when being executed, cause the virtual reality head display device to generate a pair of left-eye image and right-eye image corresponding to the test image.

In one aspect, the first determining module includes:
a first determining sub-module configured to, according to each set of feature point positions, determine a first distance between the left-eye feature point and a first border of the left-eye image and a second distance between the right-eye feature point and a second border of the right-eye image, each of the first border and the second border being a left border, or each of the first border and the second border being a right border; and a second determining sub-module configured to calculate a distance difference between the first distance and the second distance.

In one aspect, the second determining module includes:
a third determining sub-module configured to determine that the software of the virtual reality head display device does not satisfy a condition of, when being executed, causing the virtual reality head display device to generate a stereoscopic image observable by human eyes when it is determined that the distance difference between the first distance and the second distance is not within a preset range according to any one set of feature points.

In one aspect, the apparatus further includes:
a third determining module configured to determine that the software of the virtual reality head display device satisfies a condition of, when being executed, causing the virtual reality head display device to generate a stereoscopic image observable by human eyes when it is determined that, for each of N pairs of left-eye images and right-eye images acquired, the distance difference between the first distance and the second distance is within a preset range according to each set of feature points, wherein N is an integer larger than or equal to 1.

In one aspect, the apparatus further includes: a third acquiring module configured to acquire the test image; and a fourth acquiring module configured to analyze the test image to acquire the preset color value.

In one aspect, the N pairs of left-eye images and right-eye images are different from one another.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other aspects of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for testing a virtual reality head display device, comprising:
   acquiring a pair of images from the virtual reality head display device, the pair of images including a left-eye image and a right-eye image generated by the virtual reality head display device corresponding to a test image;
   analyzing the pair of images to acquire sets of feature point positions, each set of feature point positions including a first position of a left-eye feature point in the left-eye image and a second position of a right-eye feature point in the right-eye image, the left-eye feature point and the right-eye feature point for each set having the same preset color value, the preset color value having a unique color value among color values of pixels in the test image;
   for each set of left-eye feature point and right-eye feature point, determining a difference between a first relative position of the left-eye feature point in the left-eye image and a second relative position of the right-eye feature point in the right-eye image according to the set of feature point positions; and
   determining a result regarding whether the virtual reality head display device is capable to generate a stereoscopic image observable by human eyes according to the difference between the first relative position and the second relative position.

2. The method according to claim 1, wherein determining the difference between a first relative position of the left-eye feature point in the left-eye image and a second relative position of the right-eye feature point in the right-eye image according to the set of feature point positions, comprises:
   according to the set of feature point positions, determining a first distance between the left-eye feature point and a first border of the left-eye image and a second distance between the right-eye feature point and a second border of the right-eye image, each of the first border and the second border being a left border, or each of the first border and the second border being a right border; and
   calculating a distance difference between the first distance and the second distance.

3. The method according to claim 2, wherein determining the result regarding whether the virtual reality head display device is capable to generate a stereoscopic image observable by human eyes according to the difference between the first relative position and the second relative position, comprises:
   determining that the virtual reality head display device does not satisfy a condition to generate a stereoscopic image observable by human eyes when it is determined that the distance difference between the first distance and the second distance is not within a preset range according to any one set of feature points.

4. The method according to claim 2, further comprising:
   acquiring N pairs of left-eye image and right-eye image generated by the virtual reality head display device for a plurality of times;
   determining that the virtual reality head display device satisfies a condition to generate a stereoscopic image observable by human eyes, when it is determined that, for each of N pairs of left-eye images and right-eye images acquired, the distance difference between the first distance and the second distance is within a preset range according to each set of feature points, wherein N is an integer larger than or equal to 1.

5. The method according to claim 4, wherein the N pairs of left-eye images and right-eye images are different from one another.

6. The method according to claim 1, wherein the method further comprises:
   acquiring the test image; and
   analyzing the test image to acquire the preset color value.

7. The method according to claim 1, further comprising:
   executing a software of the virtual reality head display device to cause the virtual reality head display device to generate the pair of images corresponding to the test image previously stored.

8. An apparatus for testing a virtual reality head display device, comprising:
   a processor; and
   a memory for storing instructions executable by the processor;
   wherein the processor is configured to perform:
   acquiring a pair of images corresponding to a test image from the virtual reality head display device, the pair of images including a left-eye image and a right-eye image generated by the virtual reality head display device corresponding to a test image;
   analyzing the pair of images to acquire sets of feature point positions, each set of feature point positions including a first position of a left-eye feature point in the left-eye image and a second position of a right-eye feature point in the right-eye image, the left-eye feature point and the right-eye feature point for each set having the same preset color value, the preset color value having a unique color value among color values of pixels in the test image;
   for each set of left-eye feature point and right-eye feature point, determining a difference between a first relative position of the left-eye feature point in the left-eye image and a second relative position of the right-eye feature point in the right-eye image according to the set of feature point positions; and
   determining a result regarding whether the virtual reality head display device is capable to generate a stereoscopic image observable by human eyes according to the difference between the first relative position and the second relative position.

9. The apparatus according to claim 8, wherein determining the difference between a first relative position of the left-eye feature point in the left-eye image and a second relative position of the right-eye feature point in the right-eye image according to the set of feature point positions, comprises:
   according to the set of feature point positions, determining a first distance between the left-eye feature point and a first border of the left-eye image and a second distance between the right-eye feature point and a second border of the right-eye image, each of the first border and the second border being a left border, or each of the first border and the second border being a right border; and calculating a distance difference between the first distance and the second distance.

10. The apparatus according to claim 9, wherein determining the result regarding whether the virtual reality head display device is capable to generate a stereoscopic image observable by human eyes according to the difference between the first relative position and the second relative position, comprises:

determining that the virtual reality head display device does not satisfy a condition to generate a stereoscopic image observable by human eyes when it is determined that the distance difference between the first distance and the second distance is not within a preset range according to any one set of feature points.

11. The apparatus according to claim 9, wherein the processor is further configured to perform:

determining that the virtual reality head display device satisfies a condition to generate a stereoscopic image observable by human eyes, when it is determined that, for each of N pairs of left-eye images and right-eye images acquired, the distance difference between the first distance and the second distance is within a preset range according to each set of feature points, wherein N is an integer larger than or equal to 1.

12. The apparatus according to claim 8, wherein the processor is further configured to perform:

acquiring the test image; and analyzing the test image to acquire the preset color value.

13. The apparatus according to claim 11, wherein the N pairs of left-eye images and right-eye images are different from one another.

14. A non-transitory computer-readable storage medium having stored therein instructions that, when executed by a processor of an apparatus, causes the apparatus to perform a method for testing a virtual reality head display device, the method comprising:

acquiring a pair of images corresponding to a test image from the virtual reality head display device, the pair of images including a left-eye image and a right-eye image being generated by the virtual reality head display device corresponding to a test image;

analyzing the pair of images to acquire sets of feature point positions, each set of feature point positions including a first position of a left-eye feature point in the left-eye image and a second position of a right-eye feature point in the right-eye image, the left-eye feature point and the right-eye feature point for each set having the same preset color value, the preset color value having a unique color value among color values of pixels in the test image;

for each set of left-eye feature point and right-eye feature point, determining a difference between a first relative position of the left-eye feature point in the left-eye image and a second relative position of the right-eye feature point in the right-eye image according to the set of feature point positions; and determining a result regarding whether the virtual reality head display device, when being executed, is capable of causing the virtual reality head display device to generate a stereoscopic image observable by human eyes according to the difference between the first relative position and the second relative position.

15. The non-transitory computer-readable storage medium according to claim 14, wherein determining the difference between a first relative position of the left-eye feature point in the left-eye image and a second relative position of the right-eye feature point in the right-eye image according to the set of feature point positions, comprises:

according to the set of feature point positions, determining a first distance between the left-eye feature point and a first border of the left-eye image and a second distance between the right-eye feature point and a second border of the right-eye image, each of the first border and the second border being a left border, or each of the first border and the second border being a right border; and calculating a distance difference between the first distance and the second distance.

16. The non-transitory computer-readable storage medium according to claim 15, wherein determining a result regarding whether the virtual reality head display device is capable to generate a stereoscopic image observable by human eyes according to the difference between the first relative position and the second relative position, comprises:

determining that the virtual reality head display device does not satisfy a condition to generate a stereoscopic image observable by human eyes when it is determined that the distance difference between the first distance and the second distance is not within a preset range according to any one set of feature points.

17. The non-transitory computer-readable storage medium according to claim 15, wherein the method further comprises:

determining that the virtual reality head display device satisfies a condition to generate a stereoscopic image observable by human eyes, when it is determined that, for each of N pairs of left-eye images and right-eye images acquired, the distance difference between the first distance and the second distance is within a preset range according to each set of feature points, wherein N is an integer larger than or equal to 1.

18. The non-transitory computer-readable storage medium according to claim 14, wherein the method further comprises:

acquiring the test image; and analyzing the test image to acquire the preset color value.

19. The non-transitory computer-readable storage medium according to claim 17, wherein the N pairs of left-eye images and right-eye images are different from one another.

* * * * *